United States Patent [19]
Hosoya

[11] Patent Number: 5,481,519
[45] Date of Patent: Jan. 2, 1996

[54] METHOD FOR RECORDING, REPRODUCING AND MANAGING FILE DATA ON A RECORDING MEDIUM

[75] Inventor: Hideki Hosoya, Yokohama, Japan

[73] Assignee: Canon Kabushiki Kaisha, Tokyo, Japan

[21] Appl. No.: 193,619

[22] Filed: Feb. 8, 1994

Related U.S. Application Data

[63] Continuation of Ser. No. 770,337, Oct. 3, 1991, abandoned.

[30]    Foreign Application Priority Data

Oct. 3, 1990   [JP]   Japan ................................. 2-263774

[51] Int. Cl.⁶ ...................................................... G11B 7/00
[52] U.S. Cl. ............................... 369/58; 235/454; 369/59
[58] Field of Search .................................. 369/48, 59, 58, 369/47, 124, 32, 111, 49; 360/48, 27, 49, 72.1, 72.2, 54, 39; 235/454, 470, 494; 395/600

[56]    References Cited

U.S. PATENT DOCUMENTS

| | | | |
|---|---|---|---|
| 4,682,318 | 7/1987 | Busby | 369/59 |
| 4,733,386 | 3/1988 | Shimori | 369/59 |
| 4,771,375 | 9/1988 | Beglin et al. | 395/425 |
| 4,791,623 | 12/1988 | Deiotte | 369/59 |
| 4,792,937 | 12/1988 | Picard | 369/59 |
| 4,868,806 | 9/1989 | Sakagami | 369/58 |
| 4,979,159 | 12/1990 | Tsuruoka et al. | 369/58 |
| 4,982,074 | 1/1991 | Ogasawara | 235/494 |
| 4,998,009 | 3/1991 | Iijima et al. | 369/59 |
| 5,107,481 | 4/1992 | Miki et al. | 369/58 |
| 5,119,291 | 6/1992 | Flannagan et al. | 395/400 |
| 5,210,734 | 5/1993 | Sakarai | 369/49 |

FOREIGN PATENT DOCUMENTS

| | | |
|---|---|---|
| 0165382 | 12/1985 | European Pat. Off. . |
| 0260115 | 3/1988 | European Pat. Off. . |
| 1-258288 | 10/1989 | Japan . |

OTHER PUBLICATIONS

Optica '87, The International Meeting for Optical Publishing and Storage, "File System for Write–Once Optical Disks," Dirschedl et al., Amsterdam, Apr. 1987, pp. 49–58.

Primary Examiner—W. R. Young
Assistant Examiner—Thang V. Tran
Attorney, Agent, or Firm—Fitzpatrick, Cella, Harper & Scinto

[57]    ABSTRACT

A file managing method is disclosed. In the method, data is sequentially recorded with a predetermined continuous recording unit basis in a data section, and a flag indicative of addition of file data is provided in directories which manage file data. When data is additionally recorded into existing files, the data to be added is sequentially recorded into a data section as another file. The directories to manage the additional file data are recorded into a directory section by incrementing the flag. In the reproducing mode, the files having the same name and different flags are managed as a single file which has been divisionally recorded in accordance with the order of the numbers of the flags. In the recording mode of the additional data, if an invalid data section exists in the last recording information unit of the file into which the data is added, the data recorded in the last recording information unit is stored into a buffer memory and the data to be newly added is additionally sequentially recorded after the stored data. In the reproducing mode, the file other than the file whose flag has the maximum value among the files having the same file name and the different flags are managed as a recording unit region in which the last recording unit region is invalid.

5 Claims, 6 Drawing Sheets

| REGION | 1 | 2 | --- | m-1 | m | m+1 |
|---|---|---|---|---|---|---|
| | 2 | 3 | --- | m | FF | 0 |

FIG. 9B

| REGION | 1 | 2 | --- | m-1 | m | m+1 | m+2 | --- | n-1 |
|---|---|---|---|---|---|---|---|---|---|
| | 2 | 3 | --- | m | FF | m+2 | --- | --- | FF |

FIG. 9C

| REGION | 1 | 2 | --- | m-1 | m | m+1 | m+2 | --- | n-1 | n | n+1 | --- | k |
|---|---|---|---|---|---|---|---|---|---|---|---|---|---|
| | 2 | 3 | --- | n | FE | m+2 | --- | FF | n+1 | n+2 | --- | FF |

FIG. 9D

| REGION | 1 | 2 | --- | m-1 | m | m+1 | m+2 | --- | n-1 | n | n+1 | n+2 | --- | k | k+1 | k+2 | --- |
|---|---|---|---|---|---|---|---|---|---|---|---|---|---|---|---|---|---|
| | 2 | 3 | --- | n | FE | m+2 | --- | FF | n+1 | n+2 | --- | FF | 0 | 0 | --- | 0 |

METHOD FOR RECORDING, REPRODUCING AND MANAGING FILE DATA ON A RECORDING MEDIUM

This application is a continuation of application Ser. No. 07/770,337 filed Oct. 3. 1991, which is now abandoned.

BACKGROUND OF THE INVENTION

1. Field of the Invention

The present invention relates to a file managing method of an information recording medium and, more particularly, to a file managing method when data is added to a file of an information recording medium in which erasing and rewriting operations cannot be performed.

2. Related Background Art

Hitherto, as information recording media, a floppy disk in which the recording and reproducing operations are executed by using magnetism, an optical information recording medium in which the recording and reproducing operations are executed by using a light, and the like have been known. As forms of the optical information recording media, various kinds of forms such as disc form, card form, tape form, and the like have been known. Among such optical information recording media, a card-shaped optical information recording medium (hereinafter, referred to as an optical card) is a medium in which a large demand is expected as a portable information recording medium of a relatively large capacity whose size and weight are small. The information recording media are mainly classified into a medium of the type in which the erasing and rewriting operations can be performed and a medium of the type in which the erasing and rewriting operations cannot be executed due to the characteristics of the medium. However, the erasing and rewriting operations of the optical card are generally impossible. Advantages in the application of the optical card to a field such as a medical field or the like are expected since the rewriting operation cannot be performed results.

Generally, auxiliary data to manage data on a block unit basis in order to store a large capacity of data, namely, what is called a directory is used in an information recording medium. File information such as file name of a file to be managed by the directory, file length, leading data track number, and the like are ordinarily written into the directory, thereby executing a file management of the data section. The optical card, particularly, the optical card in which the erasing and rewriting operations are impossible, has a large recording capacity although its size is similar to the size of a credit card. To manage information of such a large capacity, a managing method of information by use of the directory is needed.

Figure 1:
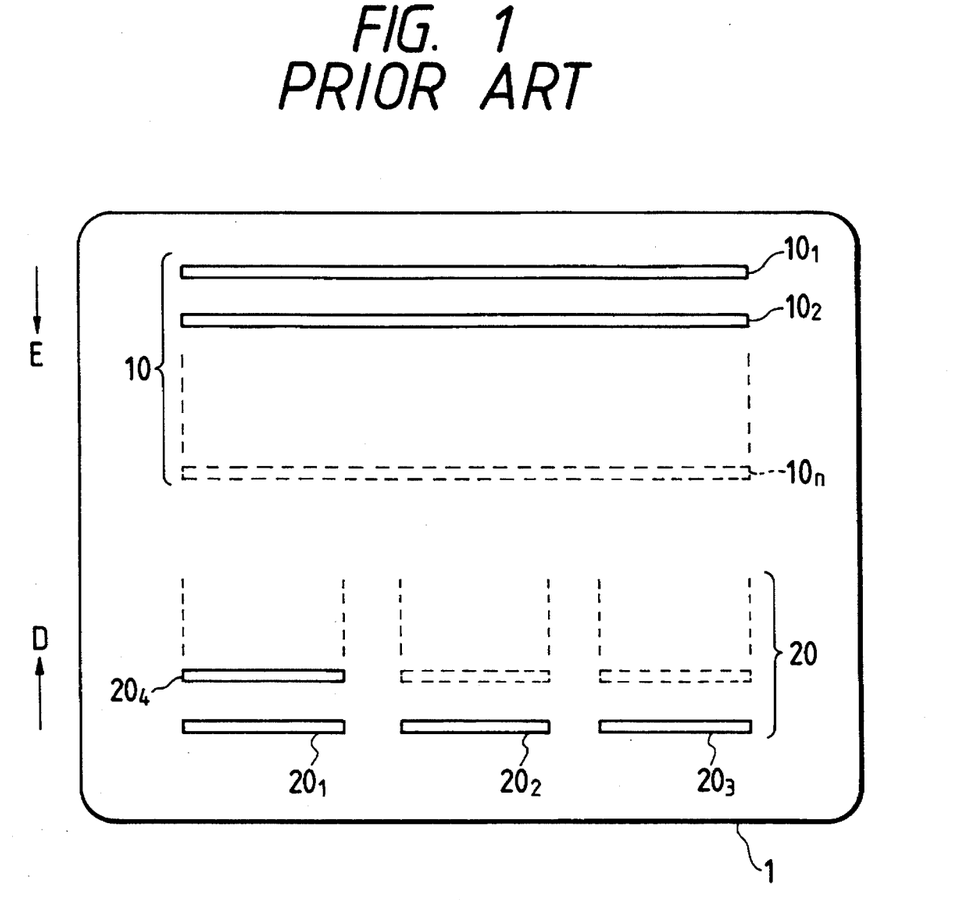
FIG. 1 is a schematic plan view of an optical card.

FIG. 1 is a schematic plan view showing an example of an optical card. In FIG. 1, an optical card 1 has a data section 10 ($10_1, 10_2, \ldots, 10_n$) comprising data tracks and a directory section 20 ($20_1, 20_2, \ldots, 20_n$). Data is written into the data section 10 in the direction indicated by an arrow E from the upper portion of the optical card. Directory information as data management information is written into the directory section 20 in the direction indicated by an arrow D from the lower portion of the optical card 1.

On the other hand, to manage data as a file, map information indicative of storage information of the file is also necessary in addition to the directory information as identification information to distinguish the file from another file. That is, there is needed information indicating from which track on the information recording medium the file is started, from which sector among sectors of several units obtained by dividing the track the file is started, or from which cluster as a management unit obtained by combining a plurality of sectors the file is started, and also indicating on which track (hereinafter, in the specification, explanation will be made on the assumption that the minimum recording unit and the management unit are set to one track) the files have been arranged in which order. Generally, such map information is called a file allocation table (FAT).

Figure 2:
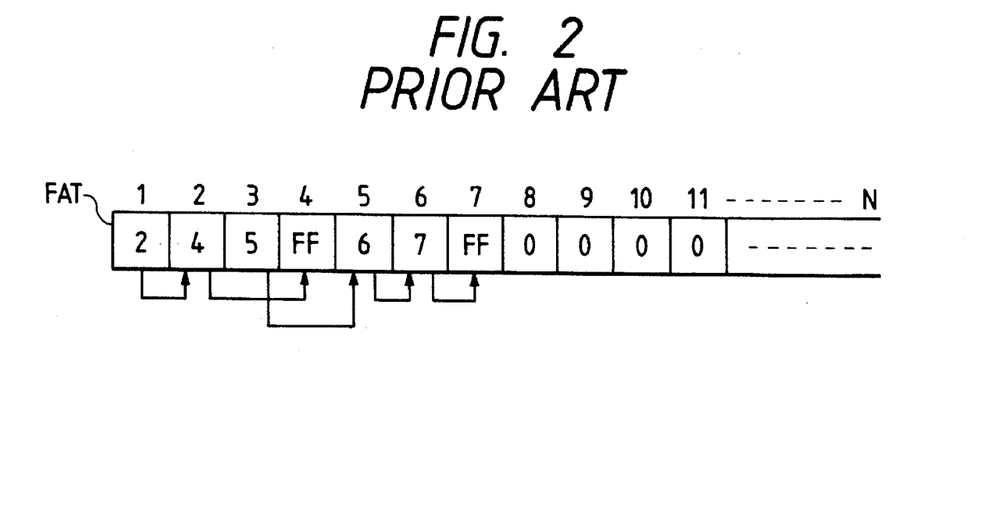
FIG. 2 is an explanatory diagram showing the concept of an FAT.

FIG. 2 is a diagram for explaining the concept of the FAT. In FIG. 2, regions 1, 2, . . . , N (generally, about 2500 regions) corresponding to the data tracks on the optical card are prepared for the FAT. The number of track track on which the information subsequent to the information recorded on the track has been recorded is recorded in each region. For instance, in FIG. 2, the file starting from the region 1 continues to the regions 2 and 4. The file starting from the region continues to the regions 5, 6, and 7. In FIG. 2, "FF" written in the region denotes that the file doesn't have any file to be continued, that is, "FF" indicates the last track of the file. "0" indicates that the track is an unused (no data is recorded) track. By using both the directory and the FAT, the ID information such as a file name and the like and the leading track number can be known from the directory and the storage information can be known from the FAT, respectively, so that a file management can be efficiently executed.

When considering an FAT to manage the files on a track unit basis, in order to record the FAT onto the optical card, assuming that the maximum track No. is set to 2500, 12 bits are needed for one region in FIG. 2 and 2500 regions are necessary. Thus, a capacity of (12 bits×2500)=30000 bits= 3750 bytes are needed. For instance, assuming that a capacity of one track is set to 512 bytes, such a capacity of 3750 bytes corresponds to a capacity of about 7.3 tracks.

In the case of an erasable and rewritable medium, for the regions of the FAT, a predetermined region is prepared on the medium and in the case where there is a change in storage information as a result of a new file being recorded or the file being updated, it is sufficient to rewrite the content in such the predetermined region with the latest information. In the case of a medium such as an optical card in which the erasing and rewriting operations are impossible, however, each time there is a change in storage information, it is necessary to additionally record a new FAT. For instance, each time a new file is added, the information recording capacity of eight tracks is used as an FAT in the above example. Assuming that the total number of tracks is set to 2500 as in the above example, even if all of the tracks are allocated to an FAT, only changes in the storage information of about 300 times (2500/8=ABT. 312) can be permitted. Actually, since the data and directories are recorded, the number of tracks which are allocated to the FAT is further reduced. On the contrary, even if there are several changes in storage information at a time (for an interval from a point of time when the optical card has been inserted into the recording and reproducing apparatus until a point of time when it is ejected out), for instance, it is sufficient to record the FAT only once before the optical card is ejected out. Therefore, the above numerical value of about 300 times is merely a target value and the actual number of change times is not so largely deviated from the above value. In other words, a point that the FAT is recorded onto the optical card in which the erasing and rewriting operations are impossible causes a problem such that the information capacity of the optical card cannot be effectively used.

To solve the above problem, it is not permitted to record data onto the track at random but it is permitted only to sequentially record data. In other words, the recording of a new file is certainly started from the next track of the last recording track at that time point and the data is sequentially recorded onto the subsequent tracks. With this method, the above problem can be solved. In this case, the first track number and the size (the number of tracks used) of file can be known from the directory information and the continuance of the information certainly exists on the next track. Therefore, even if the FAT is not recorded onto the optical card, the FAT can be constructed from the directory information.

On the other hand, as a method of adding (appending) data into the file on an information recording medium in which the erasing and rewritting operations are impossible, the applicant of the present invention has proposed a method using an appending-flag in JP-A-1-258288. That is, a flag (appending-flag) indicative of the addition of file data is provided in the directory. When data is added into the existing file, the data to be added is recorded as another file. The directory to manage the additional data file (partial file) is recorded into the directory section by incrementing the appending-flag, thereby considering that the files whose names are the same and whose appending-flags differ can be regarded as one file which has divisionally been recorded in accordance with the order of the numbers of the appending-flags.

Figure 3:
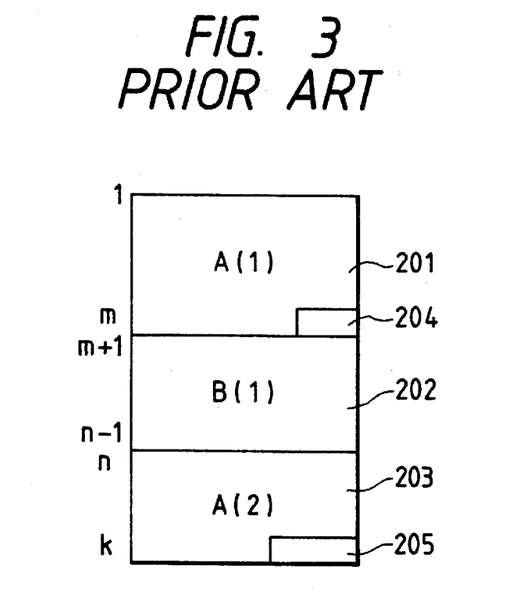
FIG. 3 is a diagram for explaining the addition of data to a file by using a conventional append flag.

FIG. 3 is a diagram for explaining the addition of data into the file by using the appending-flags and simulates a data section. In FIG. 3, A and B denote file names and a numerical value in the parentheses indicates an appending-flag. For instance, reference numeral 201 indicates the first data (partial file) in the file A. Similarly, reference numeral 202 indicates the first data in the file B and 203 denotes the next data in the file A, that is, the data added to A(1). Although not shown in FIG. 3, the directory which manages each partial file has been recorded in the directory section. In FIG. 3, A(1) occupies the tracks 1 to m, B(1) occupies the tracks (m+1) to (n-1), and A(2) occupies the tracks (n) to (k).

Assuming that data is recorded on a track unit basis, a size of the file is not always integer times as large as a capacity of one track. Therefore, for instance, like the tracks (m) and (k) in FIG. 3, invalid data sections 204 and 205 generally exist on the last track of each file. When considering that the files A(1) and A(2) are combined and are regarded as one continuous logical file A, as a theoretical file structure, the first portion of the file A(2) should exist in the invalid data section 204 and such a conversion needs to be executed. For this purpose, for instance, in the case of reading out the data on a byte unit basis, subsequent to the last valid byte of the track (m), the first byte of the track (n) needs to be read out, resulting in a problem that the processes become complicated. Since the data reproduction is executed every track, a time required for the reproduction of one track is the same irrespective of the presence or absence of the invalid data section in one track. There is also a problem such that as the number of adding times increases, a vain time accordingly increases and it takes a long time for reproduction. The above problem is typical particularly in the case where a capacity of the file to be added and the data to be added is so small to be a fraction of the data capacity in one track. For instance, assuming that the file size is equal to 1/5 of one track, since one track is necessary for one addition, if the adding process is executed four times, the contents of all of the files corresponding to the recording capacity (1/5×5=1) of one track can be actually reproduced only by reproducing five tracks including the first file.

The invention is made to solve the above problems and it is an object of the invention to provide a file managing method which can efficiently manage files.

SUMMARY OF THE INVENTION

According to the invention, the above object is accomplished by a file managing method whereby data is sequentially recorded with a predetermined continuous recording unit basis in a data section, a flag indicative of the addition of file data is provided in directories which manage file data, when data is additionally recorded into existing files, the data to be added is sequentially recorded into a data section as another file, the directories to manage the additional file data are recorded into a directory section by incrementing the flag, and in the reproducing mode, the files having the same file name and different flags are managed as a single file which has been divisionally recorded in accordance with the order of the numbers of the flags, wherein in the recording mode of the additional data, if an invalid data section exists in the last recording information unit of the file into which the data is added, the data recorded in the last recording information unit is stored into a buffer memory and the data to be newly added is additionally sequentially recorded after the stored data, and in the reproducing mode, the files other than the file whose flag has the maximum value among the files having the same file name and the different flags are managed as a recording unit region in which the last recording unit region is invalid.

DETAILED DESCRIPTION OF THE PREFERRED EMBODIMENT

Figure 4:
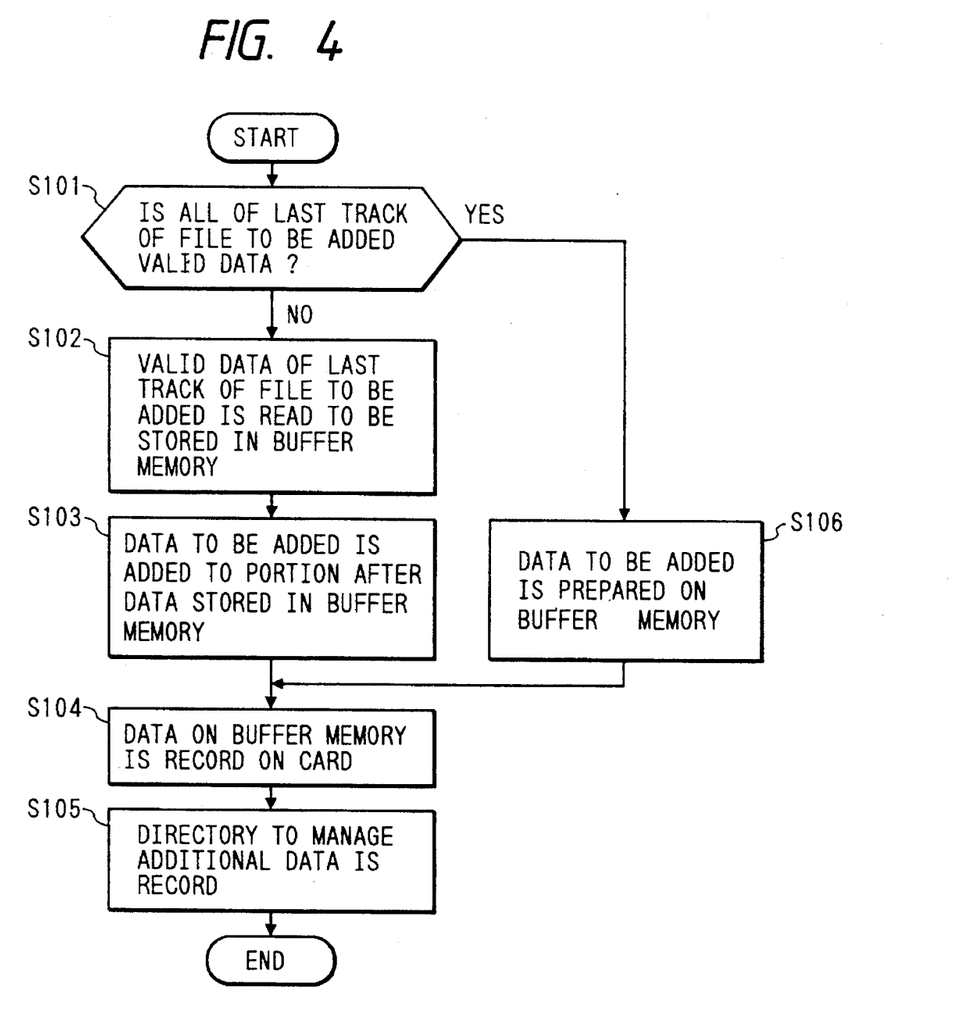
FIG. 4 is a flowchart showing an embodiment of a data adding recording process to a file according to a file managing method of the invention.
Figure 5A:
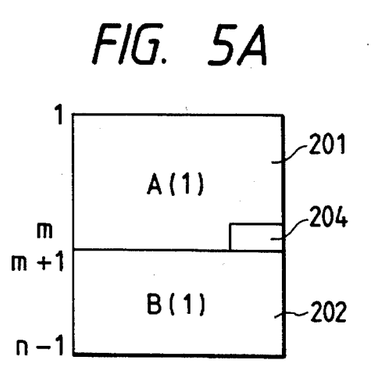
FIGS. 5A and 5B are explanatory diagrams schematically showing contents of data sections.
Figure 5B:
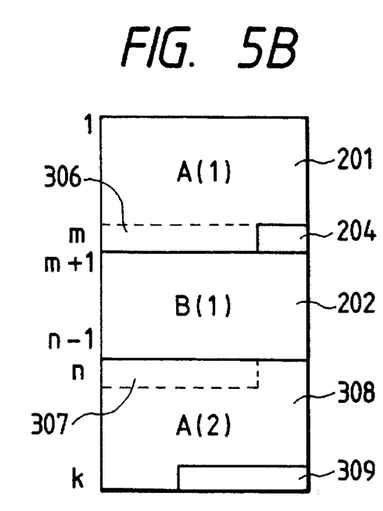

An embodiment of the invention will be described in detail hereinbelow with reference to the drawings. FIG. 4 is a flowchart of a recording process for adding data into a file according to a file managing method of the invention. In the embodiment, an example in the case of adding the file A(2) into a data section as shown in FIG. 5 will be explained. FIG. 5A shows a state before data is added. FIG. 5B shows a state after the data was added. The state of FIG. 5A is substantially the same as the state in which the file A(2) in FIG. 3 mentioned above is not recorded. Further, when the processing flow of FIG. 4 is executed, it is assumed that an optical card as a recording medium has already been set into an information recording and reproducing apparatus (not shown).

Figure 6A:
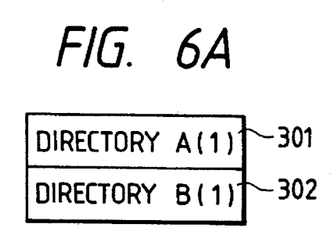
FIGS. 6A and 6B are explanatory diagrams schematically showing contents of directory sections.

In FIG. 4, in the step S101, a check is first made to see if all of the data on the last recording track of a file to be added is valid data or not. In this example, data on a last recording track (m) in a file A(1) shown in FIG. 5A is checked. The discriminating process in step S101 is performed by judging whether a file capacity in a directory 301 to manage the file A(1) recorded in the directory section as shown in FIG. 6 is integer times as large as a capacity of one track or not. That is, if YES, all of the data on the last recording track (m) is valid. If NO, invalid data exists. If it is determined in step S101 that the invalid data 204 exists as shown in FIG. 5A, valid data 306 in the file A(1) to be added as shown in FIG. 5B is stored into a buffer memory 400 in step S102. That is, the valid data 306 is stored as data 401 into the buffer memory 400 as shown in FIG. 7.

Figure 6B:
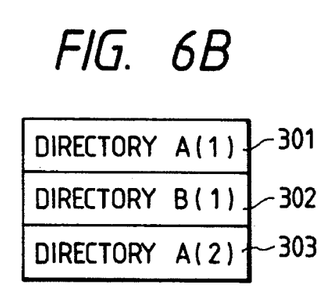
Figure 7:
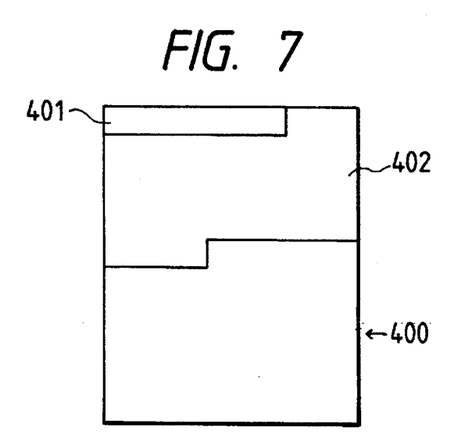
FIG. 7 is an explanatory diagram showing a content of data in a buffer memory of a host computer.

In step S103, as shown in FIG. 7, data 402 to be added to the data 401 stored in the buffer memory is added after the data 401 in the buffer memory 400. Due to this, since the data to be recorded has been prepared in the buffer memory, the data in the buffer memory is sequentially recorded every track into the data section on the optical card in step S104. In this case, as shown in FIG. 5B, since the data 401 in the buffer memory is recorded as data 307 onto a track (n), the valid data 306 on the track (m), namely, the last recording track of the file A(1) to be added has been copied as data 307 of the track (n), namely, the leading track of an additional file data A(2). The data 402 in the buffer memory 400 is recorded as data 308. Finally, as shown in FIG. 6B, a directory 303 having the same file name as that of the directory 301 to manage the additional file data A(2) is recorded into the directory section in step S105. In this case, since the maximum appending-flag value of the directory to manage a file name A so far is equal to "1", the appending-flag in the directory information is increased by "1" and is recorded as "2". If all of the data on the last track is the valid data in step S101, it is vain to copy the data on the last track of the file A(1) to be added to the head of the additional file data A(2). Therefore, such data is not copied but the data to be added is prepared into the buffer memory and recorded in step S106.

A processing procedure to make an FAT from the directory information in the reproducing mode will now be described with reference to a flowchart of FIG. 8.

Figure 8:
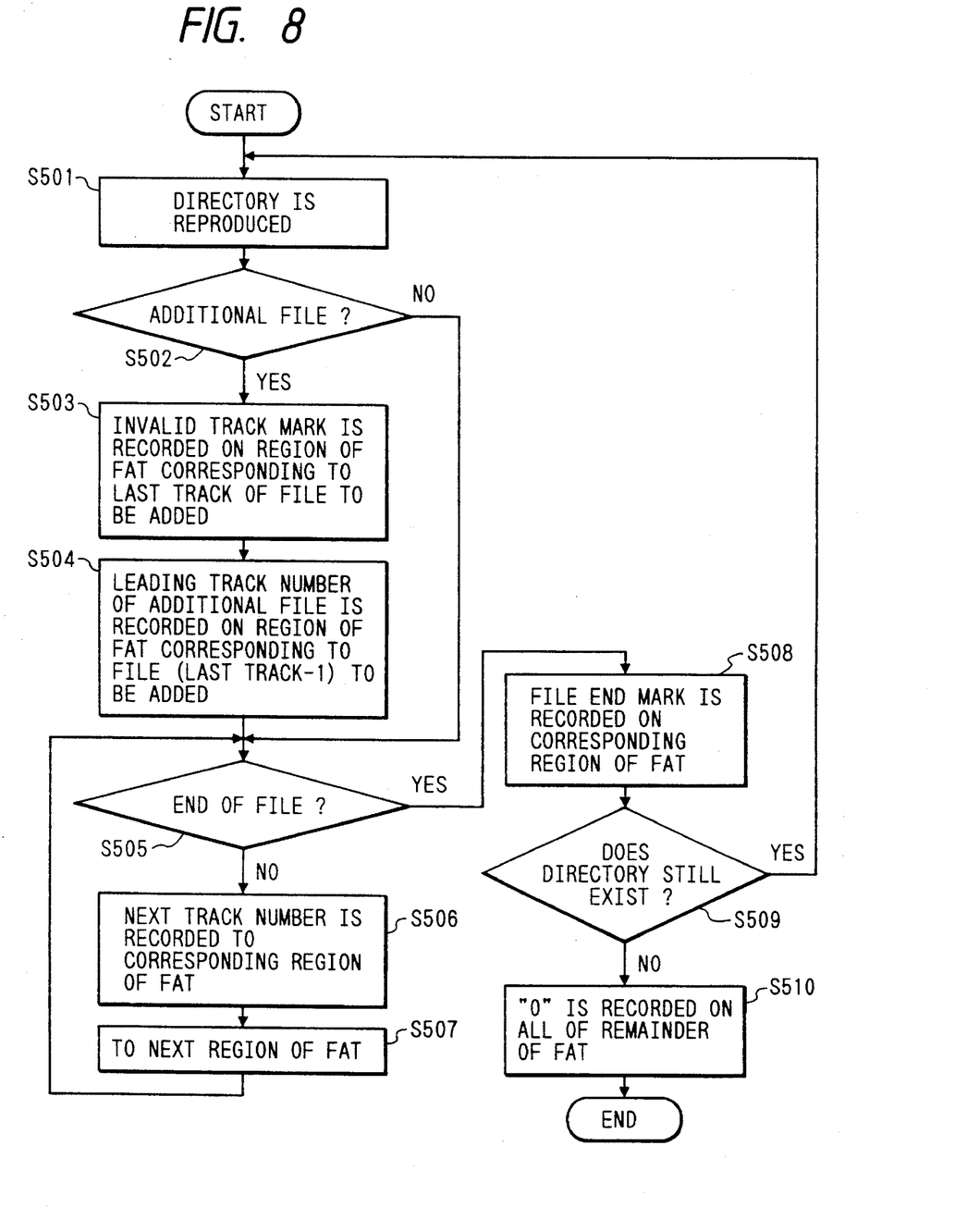
FIG. 8 is a flowchart showing a process to form an FAT from directory information.
Figure 9A:
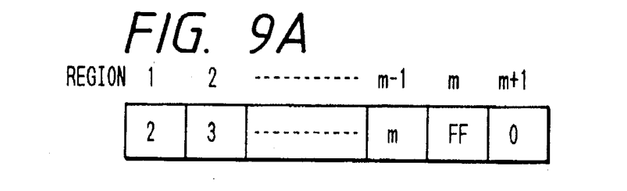
FIGS. 9A to 9D are explanatory diagrams showing contents of the FAT formed by the process of FIG. 8.
Figure 9B:
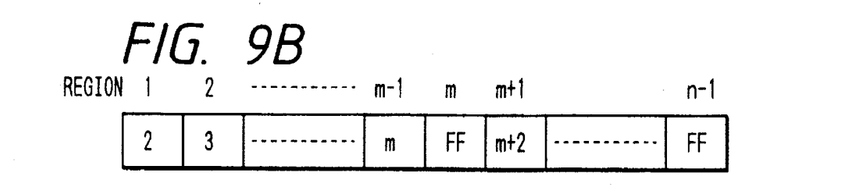

In FIG. 8, when the optical card is inserted into the information recording and reproducing apparatus, the directory information recorded in the directory section is first reproduced in step S501. That is, the directories 301 to 303 to manage the files A(1), B(1), and A(2) shown in FIG. 6B are sequentially reproduced. An FAT is formed in a memory of a host computer (not shown) on the basis of that information as will be explained hereinafter. FIG. 9A shows a state of the FAT at a time point when the directory 301 has been reproduced in step S501. A process to make the FAT shown in the diagram will be first explained. In step S502, a check is first made to see if a file which is managed by the directory is an additional file or not. In this case, since it is not an additional file, step S505 follows and a check is made to see if the file is the end of file or not. At this time, since the leading track number (in this example, track 1) in the directory information and the file capacity are known and the capacity of one track has been predetermined, the last track can be also known. Since the data has sequentially been recorded, as shown in FIG. 9A, the next track number "2" is recorded into the region 1 in step S506. The track number "3" is recorded into the region 2 in step S507. When the track numbers have been recorded into the respective regions as mentioned above and if the end of file has been detected in step S505, the processing routine advances to step S508 and "FF" indicative of the end of file is recorded into a region (m) corresponding to the last track. A check is now made in step S509 to see if any directory still exists or not. In this example, since the directory still exists, the processing routine is returned to step S501 and the directory 302 is reproduced. The FAT is updated on the basis of the above directory information by a method which is substantially the same as that mentioned above. FIG. 9B shows the FAT after completion of the updating. "FF" is recorded onto the last track and the processing routine is finished.

Figure 9C:
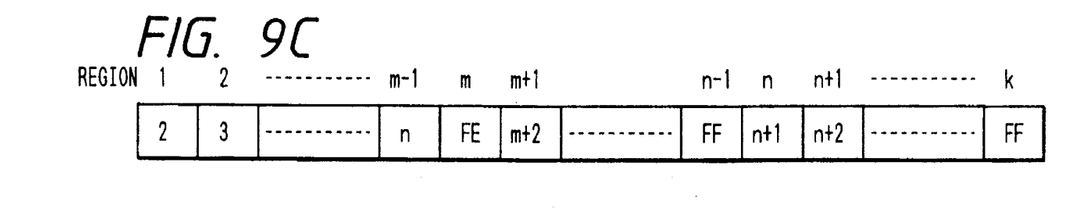
Figure 9D:
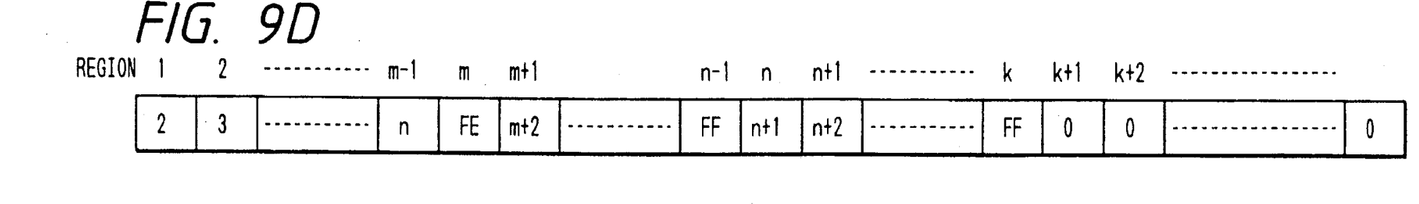

Returning to step S501, the directory 303 is reproduced and the FAT is updated on the basis of the information. In this case, since the file name is the same as A which has been reproduced before and the appending-flag is equal to "2", it Will be understood in step S502 that the file indicates the information added to the file A(1). In this case, therefore, in step 503, the content in the region (m) of the FAT corresponding to the last track (m) of the file of the same name in which the value of the appending-flag is smaller by one, that is, the added file A(1) is rewritten to "FE" indicative of the invalid track as shown in FIG. 9C. As shown in the diagram, in step S504, a region (n-1) of the FAT corresponding to a one-preceding track (m-1) of the last track is rewritten to n as a leading track of the file/A(2). The updating process is executed as mentioned above. In step S509, since the directory which is not yet reproduced doesn't exist at that time point, "0" indicative of a nonused state is recorded to all of the remaining portions of the FAT in step S510. The making process of the FAT is finished. The last state of the FAT is shown in FIG. 9D.

By constructing the FAT as mentioned above, in the case of reproducing the file A which is logically one file although it has physically been separated and recorded into two portions, data is sequentially reproduced from the track (1) to the track (m-1) in accordance with the FAT. In the region (m-1) of the FAT, information indicating that the subsequent information of the file has been recorded on the track (n) exists, so that the track (n) can be reproduced without reproducing the track (m). On the other hand, since the valid data 306 recorded on the track (m) has been copied as data 307 to the head of the track (n), by continuously reproducing the tracks until the track in which "FF" indicative of the end of file has been recorded in the FAT, the added information can be continuously reproduced without a dropout of data. Moreover, all of the data on the tracks are only the valid data and a track (for example, track (m)) in which both the valid data and the invalid data mixedly exist is not accessed. Consequently, even in the case of reproducing the data on a byte unit basis, it is sufficient to merely sequentially reproduce the data in accordance with the information indicated by the FAT without executing complicated processes by considering which data on one track is valid.

The file managing method of the invention also has an advantage such that in the case where an invalid data section exists on the last track of the file, the information on the last recording track of the file can be updated. That is, if an invalid data section exists on the last recording track, the data of the last track is once stored into the buffer memory. Therefore, if the data is updated in the buffer memory at that time point, the updated data is recorded to the head of the additional file, so that the data can be updated. If a size of file is equal to or smaller than (capacity of one track—one byte), all of the data can be updated. In this case, the directories to manage the files before updating exist as directory information. The directories having the same file name and different appending-flags as many as the number of updating times exist and all of the files of the same file name are recognized as one added file. However, since the mark "FE" indicative of the invalid track is recorded into the regions corresponding to the files in the FAT other than the file having the maximum appending-flag number, only the data of the last added (actually, updated) file can be eventually reproduced.

In the case where the capacity of the file to be added and the data to be added is so small to be 1/N (N is an integer) of the data capacity in one track, the reproduction of N tracks as in the conventional apparatus is unnecessary until a time point when the capacity of all of the files reaches the capacity of one track by the addition of (N-1) times. The data of all of the files can be obtained by reproducing only one track on which the last additional file has been recorded on the basis of the information of FAT. Even if data has been recorded on a plurality of tracks by the addition of M (M is an integer larger than N) times, the reproduction of all of the M added tracks as in the conventional apparatus is unnecessary. It is sufficient to reproduce only the tracks (the number of such tracks can be expressed by int(M/N) when it is assumed that int(M/N) gives an integer part of the value written in the parentheses) in which all of the data on one track has become the valid data by the addition and the last track of the file. (Thus, the number of tracks which are reproduced is equal to int(M/N)+1 and is obviously smaller than M.) Therefore, there are also advantages such that the number of tracks to be reproduced is small and the time which is required to reproduce is reduced.

Although the above embodiment has been described on the assumption that the minimum recording unit and management unit are set to one track, they are not limited to the track but can be also set to a sector or a cluster. Although the embodiment has been described with respect to an example in the case where a file has been added once, if files have been added a plurality of number of times, it is sufficient to repeatedly execute the process similar to that mentioned above.

As described above, according to the file managing method of the invention, in the case where the file to which data has been added is reproduced every track, the added information can be continuously reproduced by merely sequentially reproducing from the leading track in accordance with the FAT. Moreover, since all of the data on each track are only the valid data, even if the data is reproduced on a byte unit basis, it is sufficient to merely sequentially reproduce the data in accordance with the information shown by the FAT without executing complicated processes. Even in the case of a medium in which the erasing and rewriting operations are impossible, if an invalid data section exists on the last track of the file, there is also an advantage such that the information on the last recording track of the file can be updated. Particularly, if a size of file is equal to or less than (capacity of one track—one byte), all of the data can be updated. Further, if the capacity of the file to be added and the data to be added is so small to be a fraction of the capacity of data in one file, there are many advantages such that the number of reproducing tracks to reproduce the whole added file is small, the time which is required to reproduce is reduced, and the like.

What is claimed is:

1. A method of recording file data on a non-rewritable recording medium and reproducing the file data recorded on the recording medium, the recording medium having a directory region, on which a directory for managing the file data is recorded, and a file data region, on which the file data is recorded, said method comprising the steps of:

recording file data on the file data region such that the file data is sequentially recorded every recording unit, each recording unit having a predetermined data capacity and being arranged on the file data region;

recording a directory for managing the recorded file data on the directory region;

detecting, when new file data is to be added into the recorded file data on the file data region to form a series of file data, whether there is a recording unit in which an amount of data recorded thereon during said file data recording step is smaller than the predetermined data capacity;

reproducing file data of the recording unit in which the amount of the recorded file data thereof is smaller than the predetermined capacity, detected in said detecting step, and storing the file data of the detected recording unit;

recording additional file data by adding the new file data to the the file data stored at said reproducing step such that the additional file data is sequentially recorded on respective different recording units in the file data region;

recording an additional directory for managing the additional file data on the directory region; and reproducing the file data and the additional file data both recorded on the file data region without reproducing the recording unit detected in said detecting step, when a series of data files comprising the file data and the additional file data is to be reproduced by use of the directory and the additional directory.

2. A method according to claim 1, wherein the recording medium is a card-like optical information recording medium.

3. A method according to claim 1, wherein the recording unit corresponds to one track.

4. A method according to claim 1, wherein the directory includes a file name and information indicating whether an additional file data is added.

5. A method according to claim 1, wherein the file name of the directory is identical to the file name of the additional directory.

* * * * *

UNITED STATES PATENT AND TRADEMARK OFFICE
CERTIFICATE OF CORRECTION

PATENT NO. : 5,481,519

DATED : January 2, 1996

INVENTOR(S) : HIDEKI HOSOYA

It is certified that error appears in the above-identified patent and that said Letters Patent is hereby corrected as shown below:

On drawing,

SHEET 3 OF 6

FIG. 4, "IS RECORD" should read --IS RECORDED-- (both occurrences).

COLUMN 1

Line 37, "performed" should read --performed.--.
    Line 38, should be deleted.
    Line 46, "particularly," should read --particularly--.

COLUMN 2

Line 13, "track track" should read --the track--.
    Line 18, "region" should read --region 3--.
    Line 19, "doesn't" should read --does not--.
    Line 41, "content" should read --contents--.
    Line 42, "the" (first occurrence) should be deleted.

COLUMN 6

Line 19, "Will" should read --will--.
    Line 21, "step 503," should read --step S503,-- and "content" should read --contents--.
    Line 28, "file /A(2)." should read --file A(2).--.
    Line 31, "doesn't" should read --does not--.

UNITED STATES PATENT AND TRADEMARK OFFICE
CERTIFICATE OF CORRECTION

PATENT NO. : 5,481,519

DATED : January 2, 1996

INVENTOR(S) : HIDEKI HOSOYA

It is certified that error appears in the above-identified patent and that said Letters Patent is hereby corrected as shown below:

COLUMN 8

```
Line 33, "the the" should read --the--.
Line 53, "claim 1," should read --claim 4,--.
```

Signed and Sealed this

Fifth Day of November, 1996

BRUCE LEHMAN

*Attest:*

*Attesting Officer*  *Commissioner of Patents and Trademarks*